US009245023B2

(12) United States Patent
Okajima et al.

(10) Patent No.: US 9,245,023 B2
(45) Date of Patent: Jan. 26, 2016

(54) REPUTATION ANALYSIS SYSTEM AND REPUTATION ANALYSIS METHOD

(75) Inventors: Yuzuru Okajima, Tokyo (JP); Shinichi Ando, Tokyo (JP); Satoshi Nakazawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 605 days.

(21) Appl. No.: 13/511,099

(22) PCT Filed: Nov. 15, 2010

(86) PCT No.: PCT/JP2010/070645
§ 371 (c)(1),
(2), (4) Date: May 21, 2012

(87) PCT Pub. No.: WO2011/065295
PCT Pub. Date: Jun. 3, 2011

(65) Prior Publication Data
US 2012/0239665 A1 Sep. 20, 2012

(30) Foreign Application Priority Data

Nov. 27, 2009 (JP) .................................. 2009-269484

(51) Int. Cl.
*G06F 17/30* (2006.01)
*G06Q 30/02* (2012.01)
*G06Q 10/10* (2012.01)

(52) U.S. Cl.
CPC .... *G06F 17/30864* (2013.01); *G06F 17/30696* (2013.01); *G06F 17/30719* (2013.01); *G06Q 10/10* (2013.01); *G06Q 30/02* (2013.01)

(58) Field of Classification Search
CPC ................... G06F 17/30424; G06F 17/30864; G06F 17/30958; G06F 17/30699; G06F 17/30545; G06F 17/30554; G06F 17/30728; G06F 17/30867

USPC ......... 707/769, 723, 748, 722, 734, 706, 736, 707/738, 770, 798, 802, 804; 709/204, 206, 709/217; 705/7.19, 7.29, 14.58, 319
See application file for complete search history.

(56) References Cited

U.S. PATENT DOCUMENTS

2010/0070448 A1* 3/2010 Omoigui ........................ 706/47
2010/0153404 A1* 6/2010 Ghosh et al. .................. 707/748

FOREIGN PATENT DOCUMENTS

| JP | 2005-332212 A | 12/2005 |
| JP | 2007-219929 A | 8/2007 |
| JP | 2008-250975 A | 10/2008 |

OTHER PUBLICATIONS

Shigeru Fujimura, Masahi Toyoda and Masaru Kitsuregawa, "Extracting evaluative expressions and reputations from the BBS", Proceedings of the 18th Annual Conference of the Japanese Society for Artifical Intelligence, 3F1-03, 2004.

(Continued)

*Primary Examiner* — Shahid Alam
(74) *Attorney, Agent, or Firm* — Sughrue Mion, PLLC

(57) ABSTRACT

Described are a reputation analysis device, reputation analysis method, and reputation analysis-use program capable of suitably analyzing temporal changes in reputation for an object indicated by a keyword. The disclosed reputation analysis device is provided with a voluntary activity description extraction means for extracting descriptions representing voluntary activity related to an object indicated by a keyword that has been input from within a plurality of documents; and a reputation chronological data estimation means for counting the number of occurrences of voluntary activity at each time point wherein the voluntary activity expressed by a description representing the voluntary activity related to the object has been performed, and estimating reputation chronological data for chronologically representing evaluations for the object by the agents of the voluntary activity.

10 Claims, 15 Drawing Sheets

(56) References Cited

OTHER PUBLICATIONS

International Search Report in International Application No. PCT/JP2010/070645 dated Feb. 8, 2011.

Kengo Yamana et al., A Support System for Target Selection by Blog Retrieval and Similar Targets' Information, IPSJ SIG Technical Report, NII-Electronic Library, Service, Information Processing Society of Japan, 2005-DD-52 (3), pp. 17-21, Date Sep. 30, 2005.

Tomoko Toda et al., Towards Adaptive Topic Extraction from Blogs Using Locally Weighted Clustering Diversities, DEIM Forum 2009 A6-5, pp. 9, Date 2009.

Tsugutoshi Aoshima, Constrained Clustering for Blog Articles with Diverse Views, IPSJ SIG Technical Report, Information Processing Society of Japan, vol. 2009-DBS-148 No. 8, vol. 2009-F1-95 No. 8, pp. 16, Date Jul. 28, 2009.

Naoto Asahi et al, Information search assistance using action chains and extraction of action chains from the Wed, DEIM Forum 2009, A7-2, Date 2009.

* cited by examiner

Fig.3

| TIME INFORMATION (DATE) | DOCUMENT |
|---|---|
| 2008/4/2 | ... I BOUGHT A PRODUCT A. ... |
| 2008/4/3 | ... I WENT TO A FACILITY A. ... |
| 2008/4/4 | ... I SAW A PRODUCT A IN A STORE. ... |
| 2008/4/4 | ... I COOKED WITH A PRODUCT A. ... |
| 2008/4/5 | ... I KNEW A PRODUCT A ON A MAGAZINE. ... |
| 2008/4/5 | ... I QUITTED USING A PRODUCT A. ... |
| 2008/4/7 | ... I WARMED FOOD WITH A PRODUCT A. ... |
| 2008/4/7 | ... I USE A SERVICE A EVERYDAY. ... |
| 2008/4/7 | ... I WAS GIVEN A PRODUCT A. ... |
| 2008/4/8 | ... I RESERVED A PRODUCT A. ... |
| 2008/4/9 | ... I DISCARDED A PRODUCT A. ... |

Fig.4

| VOLUNTARY EXPRESSION |
|---|
| "BUY" |
| "GO" |
| "INSTALL" |
| "RECOMMEND" |
| "RESERVE" |
| "CHECK" |
| "DISCARD" |
| "UNINSTALL" |
| "QUIT" |
| "DO NOT BUY" |

Fig.6

| TIME INFORMATION (DATE) | VOLUNTARY ACTION DESCRIPTION |
|---|---|
| 2008/4/2 | I BOUGHT A PRODUCT A. |
| 2008/4/4 | I COOKED WITH A PRODUCT A. |
| 2008/4/5 | I QUITTED USING A PRODUCT A. |
| 2008/4/7 | I WARMED FOOD WITH A PRODUCT A. |
| 2008/4/8 | I RESERVED A PRODUCT A. |
| 2008/4/9 | I DISCARDED A PRODUCT A. |

Fig.7

| DATE (TIME INFORMATION) | ESTIMATED VALUE (SCALAR) |
|---|---|
| 2005/4/1 | 3 |
| 2005/4/2 | 3 |
| 2005/4/3 | 2 |
| 2005/4/4 | 2 |
| 2005/4/5 | 7 |
| 2005/4/6 | 6 |
| 2005/4/7 | 6 |
| 2005/4/8 | 5 |
| 2005/4/9 | 2 |
| 2005/4/10 | 2 |

Fig.8

| VOLUNTARY EXPRESSION | EVALUATION TYPE |
|---|---|
| "BUY" | POSITIVE |
| "GO" | POSITIVE |
| "INSTALL" | POSITIVE |
| "RECOMMEND" | POSITIVE |
| "RESERVE" | POSITIVE |
| "CHECK" | POSITIVE |
| "DISCARD" | NEGATIVE |
| "UNINSTALL" | NEGATIVE |
| "QUIT" | NEGATIVE |
| "DO NOT BUY" | NEGATIVE |

Fig.9

| TIME INFORMATION (DATE) | VOLUNTARY ACTION DESCRIPTION | EVALUATION TYPE |
|---|---|---|
| 2008/4/2 | I BOUGHT A PRODUCT A. | POSITIVE |
| 2008/4/4 | I COOKED WITH A PRODUCT A. | POSITIVE |
| 2008/4/5 | I QUITTED USING A PRODUCT A. | NEGATIVE |
| 2008/4/7 | I WARMED FOOD WITH A PRODUCT A. | POSITIVE |
| 2008/4/8 | I RESERVED A PRODUCT A. | POSITIVE |
| 2008/4/9 | I DISCARDED A PRODUCT A. | NEGATIVE |

Fig.10

| DATE (TIME INFORMATION) | ESTIMATED VALUE (VECTOR) | |
|---|---|---|
| | POSITIVE | NEGATIVE |
| 2005/4/1 | 3 | 0 |
| 2005/4/2 | 2 | 1 |
| 2005/4/3 | 1 | 1 |
| 2005/4/4 | 2 | 0 |
| 2005/4/5 | 0 | 7 |
| 2005/4/6 | 1 | 5 |
| 2005/4/7 | 0 | 6 |
| 2005/4/8 | 0 | 5 |
| 2005/4/9 | 0 | 2 |
| 2005/4/10 | 0 | 2 |

Fig.13

| DATE (TIME INFORMATION) | AMOUNT OF CHANGE (SCALAR) |
|---|---|
| 2005/4/1 | – |
| 2005/4/2 | – |
| 2005/4/3 | 1.5 |
| 2005/4/4 | 2.6 |
| 2005/4/5 | 3.0 |
| 2005/4/6 | 1.2 |
| 2005/4/7 | 0.54 |
| 2005/4/8 | 0.33 |
| 2005/4/9 | – |
| 2005/4/10 | – |

Fig.14

| DATE (TIME INFORMATION) | ESTIMATED VALUE (VECTOR) | |
|---|---|---|
| | POSITIVE | NEGATIVE |
| 2005/4/1 | — | — |
| 2005/4/2 | — | — |
| 2005/4/3 | 0.40 | 7 |
| 2005/4/4 | 0.33 | 6 |
| 2005/4/5 | 0.33 | 11 |
| 2005/4/6 | 0 | 1.6 |
| 2005/4/7 | 0 | 0.58 |
| 2005/4/8 | 0 | 0.36 |
| 2005/4/9 | — | — |
| 2005/4/10 | — | — |

REPUTATION ANALYSIS SYSTEM AND REPUTATION ANALYSIS METHOD

TECHNICAL FIELD

This invention relates to a reputation analysis system, a reputation analysis method and a program for reputation analysis, which are utilized for analyzing change with time in reputation about a subject indicated by an inputted keyword.

BACKGROUND ART

There are technologies which extract people's reputation about a certain subject by analyzing a large amount of text information. Such technologies are very useful for supporting people's decision making and for marketing. For example, for persons wondering whether or not to buy a certain product, it is important reference information how other people evaluate the product. Further, knowing reputation about a certain product, enterprises can reflect it to development and promotion of a successive product.

In particular, technologies which analyze change in reputation with time by analyzing the number of appearances of evaluations in the form of a time series have attracted much attention in recent years. A first advantage of analyzing change in reputation with time is that it is possible to preclude evaluations of the past which are too old and ineffective. A second advantage is that knowing a cause of a change in reputation becomes an important hint for decision making.

For example, it is supposed that a serious problem about a subject became clear at a point of time t, and since then, reputation of the subject changed and everyone came to have a negative evaluation of the subject. In such a case, evaluations in days after t, where people know the problem, are more important hints for decision making than that in days before t, where people did not know the problem.

Also in such a case, by identifying a point of time of the reputation change, it is possible to know the serious problem about the subject which influenced an evaluation by individual person, and to use it as an important hint for decision making.

Because of the advantages described above, technologies of extracting change in reputation with time from a set of a large number of documents such as blogs have been studied in a variety of ways.

Non-patent document 1 describes a technology which extracts from documents, using an evaluation-expression extraction technology, expressions used by writers of the documents when exhibiting their own evaluations about a subject, and then sums up the numbers of appearances of the expressions and graphs them in the form of a time-series, and thereby presents a change in reputation with time.

The technology described in non-patent document 1 firstly collects evaluation expressions such as "good" and "bad" which are used by writers when exhibiting their evaluations of a subject, by means of mechanical automatic processing, and registers them in a dictionary in advance. The technology described in non-patent document 1 limits evaluation expressions to adjectives and adjectival verbs, and to extract such evaluation expressions, it uses a method of non-patent document 2.

By extracting expressions in documents which agree with expressions in the dictionary, the technology described in non-patent document 1 collects affirmative evaluation expressions and negative evaluation expressions. The technology described in non-patent document 1 regards a graph of the numbers of appearances of affirmative evaluation expressions and negative evaluation expressions as a graph indicating reputation about a subject at each point of time, and outputs it.

Non-patent document 2 describes a technology, which is used in non-patent document 1, of extracting expressions which appear in an unevenly concentrated manner in affirmative reviews and negative reviews as evaluation expressions. The technology described in non-patent document 2 extracts expressions, such as "bright", "beautiful", "terrible" and "bad", which are often used by writers of reviews when exhibiting their own evaluations.

Further, technologies relating to the present invention are described in patent documents 1-3.

A technology described in patent document 1 is a search server for searching for information used to solve a problem, which stores sub-tree information representing a hierarchical structure about a task including an object word and an action word, and stores the object word and action word and a modifier representing the problem, relating the sub-tree information and the group of words to each other. The search server recognizes an object word, an action word and a modifier from inputted search words. The search server acquires stored sub-tree information on the basis of the recognized object word, action word and modifier.

As the search server described in patent document 1 is configured as described above, the user can search for information for solving a problem by a simple and easy input, and thus can reduce the effort of input.

A technology described in patent document 2 is an emotion evaluation system, which collects text information existing on a network, then classifies the text information on the basis of time information obtained along with the text information, and stores the text information in a storage device. From the text information, the emotion evaluation system extracts a combination of an adjective and an adverb which shows the sensitivity, and a noun relevant to the formers, using a dictionary stored in a storage device. Further, the emotion evaluation system assigns, from among adjectives and adverbs relevant to each noun extracted in an emotion information extraction process, an adjective and an adverb whose appearance rates are high as indexes, and generates an emotion map corresponding to each noun, which indicates transitions of appearance rates of adjectives and adverbs resembling respectively the adjective and the adverb assigned as indexes. The emotion evaluation system performs an emotion information mapping process of storing the generated emotion map in a storage device as an emotion map database. The emotion evaluation system performs the following emotion map search process. First, when a search keyword is inputted, the emotion evaluation system searches for an emotion map resembling the most an emotion map created on the basis of a word identical with the search keyword from the emotion map database stored in the storage device. Secondly, the emotion evaluation system outputs the search result as a predictive result of an evaluation.

As the emotion evaluation system described in patent document 2 is configured as described above, the user can search for a transition of emotion with high accuracy.

A technology described in patent document 3 is a time series information processing apparatus, which detects the user's specifying input of a first time series information as time series information in which a date and time is related to a value. The time series information processing apparatus acquires a second time series information for comparing with the first time series information from a database storing a plurality of kinds of time series information. The time series information processing apparatus compares a trend of change during a predetermined period of time in the values in the first time series information with that in the values in the second time series information, and calculates a degree of resemblance between the trends of change as a correlation value by the use of a predetermined evaluation function. When the correlation value is equal to or larger than a predetermined threshold value, the time series information processing apparatus makes an order to display the first and the second time series information in an overlapping form on one screen.

By having the above-described configuration, the time series information processing apparatus described in patent document 3 can provide a technology which visualizes a plurality of pieces of time series information correlated with each other and thereby supports an analysis.

CITATION LIST

Patent Literature

[Patent Document 1] Japanese Patent Application Laid-Open No. 2005-332212
[Patent Document 2] Japanese Patent Application Laid-Open No. 2007-219929
[Patent Document 3] Japanese Patent Application Laid-Open No. 2008-250975

Non-Patent Literature

[Non-patent document 1] Kengo Yamana, Keisuke Nishimura, Toshihiro Takizawa, Masahide Yuasa and Minoru Ohyama, "A support system for target selection by blog retrieval and similar target's information", Information Processing Society of Japan SIGDD Technical Reports, 2005-DD-52, pp 17-21, 2005.

[Non-patent document 2] Shigeru Fujimura, Masashi Toyoda and Masaru Kitsuregawa, "Extracting evaluative expressions and reputations from the BBS", Proceedings of the 18th Annual Conference of The Japanese Society for Artificial Intelligence, 3F1-03, 2004.

SUMMARY OF THE INVENTION

Problem to be Solved by the Invention

However, with the methods of extracting expressions used by writers when exhibiting their own evaluations, it is not possible to measure continuously and constantly change in reputation which people have with regard to a subject, and thus it is not possible to analyze change in reputation with time appropriately.

It is because expressions used by people when exhibiting their own evaluations do not continue being exhibited continuously and constantly. Accordingly, it is not possible to correctly determine whether or not a change in reputation actually occurred on the basis of such expressions.

The present invention solves the problem described above, by focusing attention on a description of a voluntary action and thereby estimating an evaluation held by an agent of the action. None of non-patent documents 1 and 2 and patent documents 1-3 described above discloses a technology which estimates an evaluation held by an agent of an action by discriminating between a group of words expressing voluntary actions and a group of words expressing involuntary actions.

Therefore, the objective of the present invention is provide a reputation analysis system, a reputation analysis method and a program for reputation analysis which to solve the above-described problem and thus can appropriately analyze change with time in reputation of a subject indicated by a keyword.

Means for Solving a Problem

In order to achieve the above-mentioned objective, a reputation analysis system of the present invention includes voluntary action description extraction means which extracts, from a plurality of documents, a description representing a voluntary action relating to a subject indicated by an inputted keyword; and reputation time-series data estimation means which counts the number of appearances of voluntary actions for each point of time when a voluntary action expressed by a description representing a voluntary action relating to the subject is performed, and thereby estimating reputation time-series data which represents evaluations of the subject by agents of the voluntary actions in the form of a time series.

In order to achieve the above-mentioned objective, a reputation analysis method of the present invention extracts, from a plurality of documents, a description representing a voluntary action relating to a subject indicated by an inputted keyword; and counts the number of appearances of voluntary actions for each point of time when a voluntary action expressed by a description representing a voluntary action relating to the subject is performed, and thereby estimating reputation time-series data which represents evaluations of the subject by agents of the voluntary actions in the form of a time series.

In order to achieve the above-mentioned objective, a program recording medium storing a program for reputation analysis of the present invention for enabling a computer to execute the processes of extracting, from a plurality of documents, a description representing a voluntary action relating to a subject indicated by an inputted keyword; and counting the number of appearances of voluntary actions for each point of time when a voluntary action expressed by a description representing a voluntary action relating to the subject is performed, and thereby estimating reputation time-series data which represents evaluations of the subject by agents of the voluntary actions in the form of a time series.

Effect of the Invention

A reputation analysis system, a reputation analysis method and a program for reputation analysis of the present invention make it possible to appropriately analyze change with time in reputation of a subject indicated by a keyword.

BRIEF DESCRIPTION OF THE DRAWINGS

FIG. 3 is a table showing an example of a document set stored in a document set database 30.

FIG. 4 is a table showing examples of contents stored in a dictionary of voluntary action expressions 20.

FIG. 6 is a table showing an example of data outputted by a voluntary action description extraction unit 10.

FIG. 7 is a table showing an example of reputation time-series data estimated by a reputation time-series data estimation unit 40.

FIG. 8 is a table showing examples of contents stored in a dictionary of voluntary action expressions 20 in a second exemplary embodiment.

FIG. 9 is a table showing an example of data outputted by a voluntary action description extraction unit 10 according to the second exemplary embodiment.

FIG. 10 is a table showing an example of reputation time-series data estimated by a reputation time-series data estimation unit 40 according to the second exemplary embodiment.

FIG. 13 is a table showing an example of data outputted by a reputation change determination unit 50 in a case where reputation time-series data is a series of scalar values.

FIG. 14 is a table showing an example of data outputted by the reputation change determination unit 50 in a case where reputation time-series data is a series of vector values.

EXEMPLARY EMBODIMENTS FOR CARRYING OUT OF THE INVENTION

Figure 1:
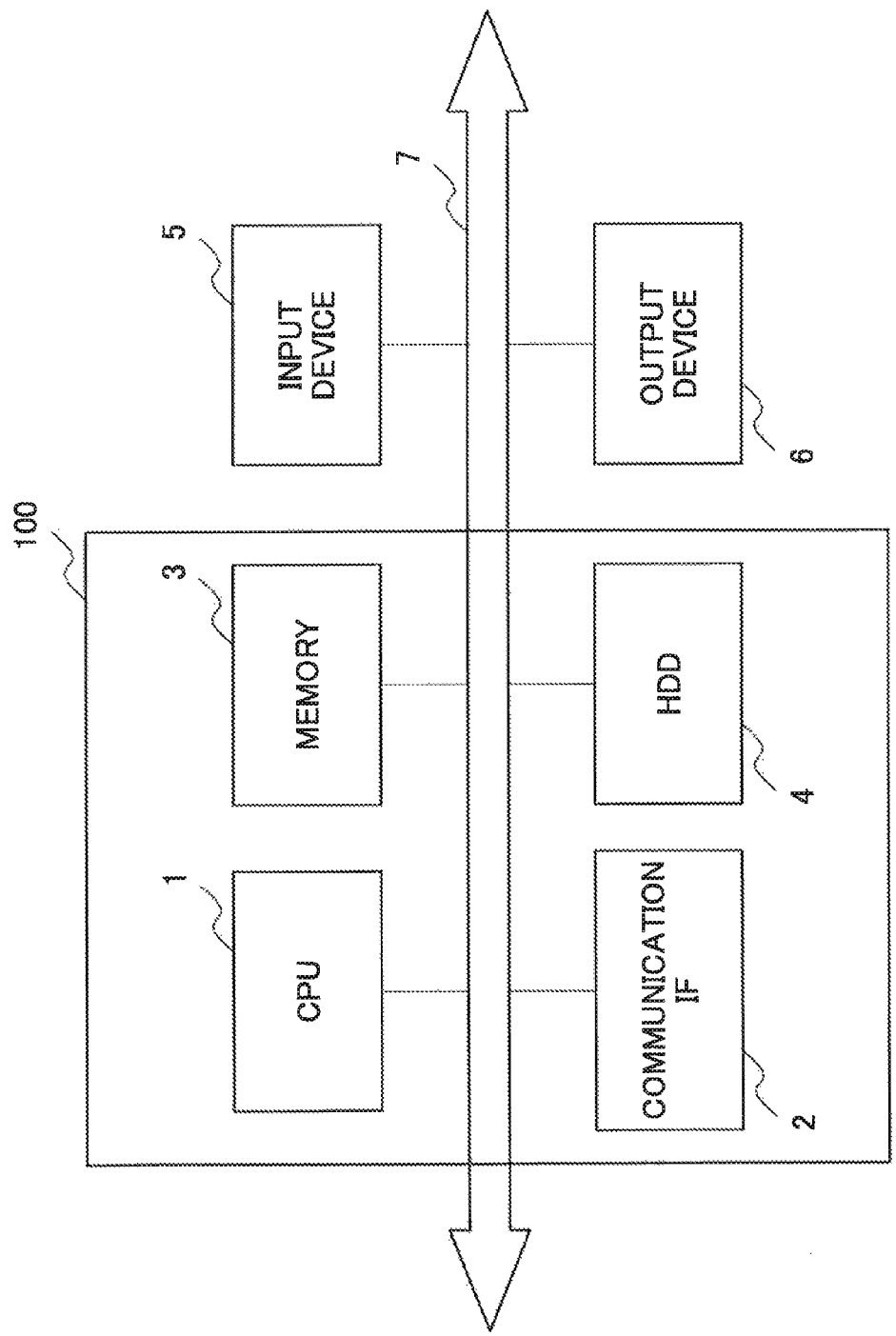
FIG. 1 is a hardware configuration diagram of a reputation analysis system 100 according to a first exemplary embodiment of the present invention.

In many of technical documents relating to the present invention, two terms of evaluation and reputation are not clearly discriminated by their meanings. However, almost in general, there is a tendency to discriminately use the two terms by calling an opinion such as affirmation or negation which individual person has with regard to a subject an "evaluation" and by calling an overall evaluation of a society which is obtained as a result of collecting evaluations by many people "reputation". Following it, in the present specification, the two terms are clearly discriminated by regarding an "evaluation" as that representing an opinion such as affirmation or negation which individual person has with regard to a subject and "reputation" as that representing an overall evaluation of a society which is obtained as a result of collecting evaluations by many people, respectively. Here, such discriminative use of the two words is merely for discrimination for convenience to ease understanding the content, and therefore, it does not restrict the technical scope of the present invention.

First, in order to ease understanding the present invention, the background and the outline of the present invention will be described.

In blogs and the like, points of time when people intend to directly exhibit their evaluations by themselves are unevenly concentrated at when new information on a subject is released. Then, at other points of time, it is unlikely that evaluation expressions appear in a sufficient amount for an analysis of change in reputation.

For example, it is supposed that a product A has been newly put on sale. People become interested in new information on the new release of the product A, and various reviews such as "The product A is good in this point.", "It is bad in this point." are posted on blogs. However, after a while, the topic loses its novelty, and the product A becomes familiar and an everyday affair, and accordingly intentional evaluations come not to be given, and thus the number of explicit evaluation expressions decreases. The decrease in the number of evaluation expressions is not due to a change in reputation of the product A, but is due to merely the loss of novelty of the information.

There exists a tendency that, just after new information is obtained, humans intend to exhibit their own evaluations determined on the basis of the information. However, there also exists a tendency that, when the information becomes familiar after a time has passed, humans lose motivation to express evaluations and thus come not to exhibit their own evaluations in documents. Accordingly, with methods of extracting expressions used when exhibiting evaluations of a subject, it is not possible to measure continuously and constantly change with time in an evaluation by individual person. In turn, also with respect to reputation which is an integral obtained by aggregating evaluations by many people, its change with time cannot be measured continuously and constantly. Therefore, methods of using explicit evaluation expressions are not suitable for watching long-term change in reputation with time.

On the other hand, on determining some evaluation of a subject, as a result of it, humans take a variety of voluntary actions reflecting content of the evaluation. For example, a person who determined a positive evaluation of a certain product thereafter looks for, reserves, buys or actually uses the product. If considering it conversely, it is possible to infer that a person who looks for, reserves, buys or uses a certain product has a positive evaluation of the product.

Differing from descriptions where writers intentionally exhibit their evaluations of a subject, descriptions of voluntary actions are descriptions which humans use in everyday records in daily life. Accordingly, even in a period of time when humans do not intend to explicitly describe evaluations of a subject, descriptions of voluntary actions are used continuously and constantly. Therefore, if it is possible to estimate people's evaluations from descriptions of voluntary actions, continuous and constant observation of change with time is possible also about reputation which is an integral of evaluations by many people.

In the above-described example, even when the product A becomes familiar and an everyday affair, descriptions of voluntary actions relating to the product A are included in a variety of people's everyday records. Accordingly, compared to descriptions of explicit evaluation expressions, descriptions of voluntary actions are observed continuously and constantly. Descriptions of voluntary actions relating to the product A are, for example, "Today, I went out carrying the product A.", "I cooked with the product A." and the like.

On the basis of the above-described consideration, a reputation analysis system of the present invention measures how people evaluate a subject continuously and constantly, using descriptions of voluntary actions as keys.

In the following, exemplary embodiments of the present invention will be described.

Here, with respect to the following exemplary embodiments of the present invention, description will be given assuming that documents subjected to the present invention are written in the Japanese language. However, the technical scope of the present invention is not limited to that case. That is, even when treating documents written in languages other than Japanese as objects, the present invention can be applied adapting the present invention to grammar of each of the languages.

<First Exemplary Embodiment>

FIG. 1 is a hardware configuration diagram of a reputation analysis system 100 according to a first exemplary embodiment of the present invention. As shown in FIG. 1, the reputation analysis system 100 includes a CPU (central processing unit) 1, a communication interface (IF) 2, a memory 3, an HDD (hard disk drive) 4, an input device 5 and an output device 6. These components are connected with each other via a bus 7, and they input and output data via the bus. The communication IF 2 is an interface for connecting with an external network. The input device 5 is, for example, a keyboard or a mouse. The output device 6 is, for example, a display or the like. The present invention is realized by the CPU 1 executing a program stored in the memory 3 or the HDD 4.

Figure 2:
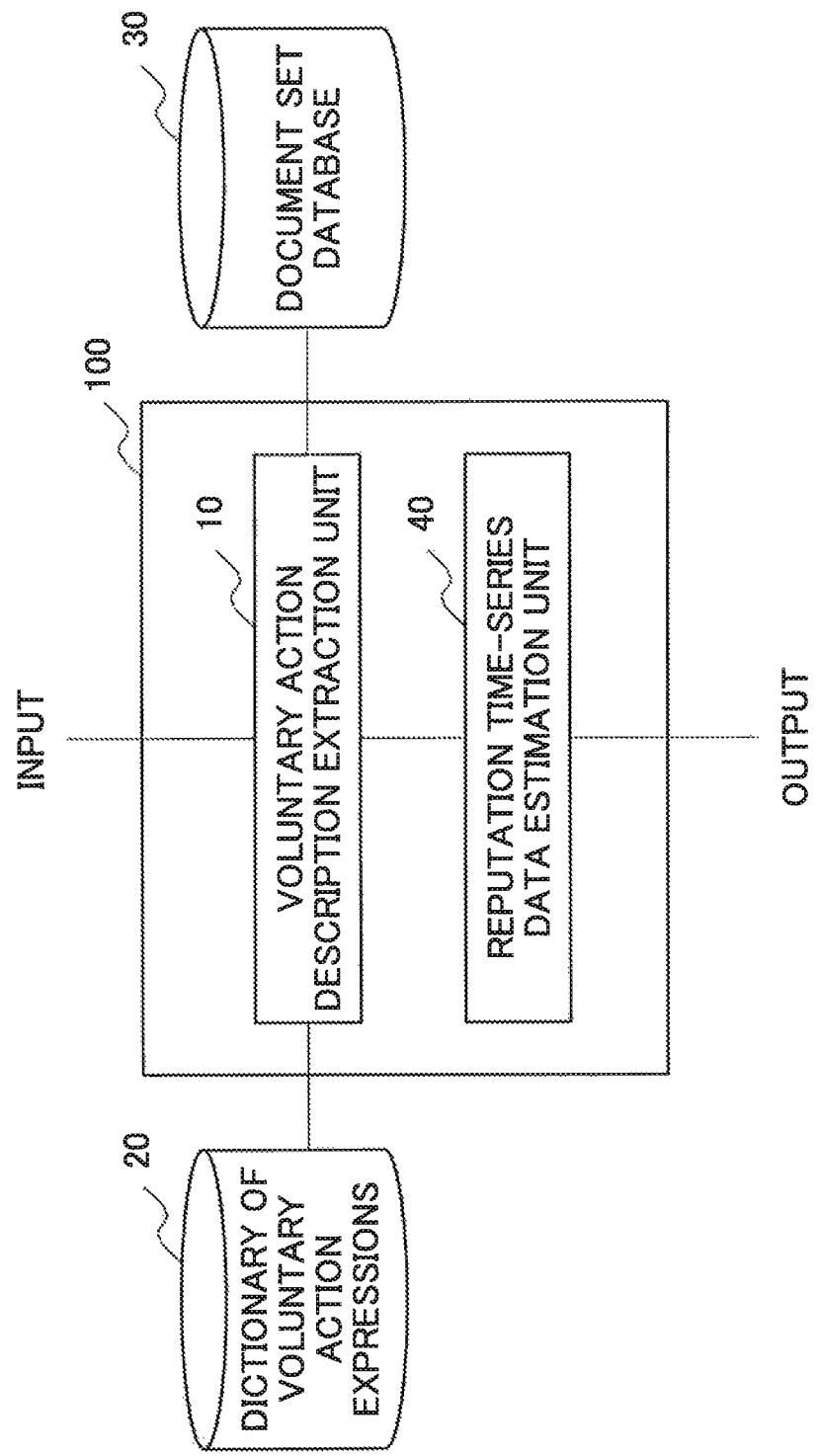
FIG. 2 is a block diagram showing a functional configuration of the reputation analysis system 100 according to the first exemplary embodiment of the present invention.

FIG. 2 is a block diagram showing a functional configuration of the reputation analysis system 100 according to the first exemplary embodiment of the present invention. As shown in FIG. 2, the reputation analysis system 100 includes a voluntary action description extraction unit 10 and a reputation time-series data estimation unit 40. Further, the reputation analysis system 100 is connected with a dictionary of voluntary action expressions 20 and a document set database 30 via a LAN (Local Area Network) or a WAN (Wide Area Network), for example. Here, the reputation analysis system 100 may include at least either of the dictionary of voluntary action expressions 20 and the document set database 30. In such a case, a dictionary of voluntary action expressions 20 may be realized by a storage device such as the memory 3 and the HDD 4.

In the reputation analysis system 100, the voluntary action description extraction unit 10 extracts, from within a plurality of documents, descriptions expressing voluntary actions relating to a subject indicated by an inputted keyword.

The dictionary of voluntary action expressions 20 stores expressions which express voluntary actions (voluntary action expressions) relating to a subject. Voluntary action expressions are expressions which are considered to express voluntary actions relating to a subject. In the present exemplary embodiment, using the dictionary of voluntary action expressions 20, the voluntary action description extraction unit 10 extracts descriptions which include an inputted keyword and expressions stored in the dictionary of voluntary action expressions 20 from within a plurality of documents. Using the voluntary action expressions extracted by the use of the dictionary of voluntary action expressions 20 as keys indicating evaluations of a subject, the reputation time-series data estimation unit 40, which will be described later, estimates evaluations people have on the subject at each point of time.

The document set database 30 provides a document set (a plurality of documents) which is to be a target of the extraction of descriptions expressing voluntary actions performed by the voluntary action description extraction unit 10. FIG. 3 is a table showing an example of a document set stored in the document set database 30. As shown in FIG. 3, a document set stored in the document set database 30 includes contents and time information of documents. As specific examples of documents shown in FIG. 3, mentioned are text data acquired from blogs and web pages opened to the public on the internet, e-mails and the like. Time information is, for example, an update date attached to a blog and a web page, sending and receiving dates of an e-mail, and the like. Time information may be that representing a time when a document is created and also that representing a time when a document is dispatched. A unit of a point of time included in time information may be any one of the levels of year, month, day, hour, minute and second. Here, a document set stored in the document set database 30 does not need to be that including time information.

From descriptions expressing voluntary actions relating to a subject, the reputation time-series data estimation unit 40 estimates reputation time-series data which represents evaluations by agents of the voluntary actions on the subject in a time series. Specifically, on the basis of descriptions expressing voluntary actions extracted by the voluntary action description extraction unit 10, the reputation time-series data estimation unit 40 estimates and aggregates evaluations which agents of the actions have on a subject and which are primary causes of the voluntary actions. On the basis of the result, the reputation time-series data estimation unit 40 estimates time-series data (reputation time-series data) representing reputation of a subject at each point of time for which the voluntary action description extraction unit 10 extracted descriptions expressing voluntary actions.

For example, the reputation time-series data estimation unit 40 may generate time-series data of voluntary actions by counting the number of appearances of voluntary actions for each point of time when voluntary actions expressed by descriptions expressing voluntary actions relating to a subject are performed. The reputation time-series data estimation unit 40 may treat the generated time-series data of voluntary actions as estimated values of reputation time-series data.

Next, description will be given in detail of the voluntary action description extraction unit 10 and the dictionary of voluntary action expressions 20.

The voluntary action description extraction unit 10 extracts descriptions of voluntary actions performed as results of evaluations from a document set. For example, it is supposed that the following description exists in a blog on the internet.

"Because product A was best in performance and low in price, I bought a product A yesterday."

In the above-mentioned description, "bought" is a voluntary action performed as a result of an evaluation. The previous technologies relating to the present invention have extracted descriptions "good in performance" and "low in price", which are expressions used to explicitly exhibit evaluations of a subject as evaluation expressions. In contrast to that, the voluntary action description extraction unit 10 of the present invention extracts a description "bought a product A yesterday." Further, the configuration may be such that descriptions of voluntary actions are extracted in addition to evaluation expressions which alone have been extracted in the relating technologies.

The voluntary action description extraction unit 10 does not extract descriptions of involuntary actions. It is because, differing from that of voluntary actions, descriptions of involuntary actions cannot be used for estimating evaluations held by agents of the actions. For example, a description "I saw a product A in an electric appliance store yesterday." is supposed to exist. In this case, because an action of "see" occurs not depending on intention of an agent of the action, it cannot be a key to estimate what kind of evaluation the agent of the action "I" has on the subject. Alternatively, a description "I went to see a product A in an electric appliance store yesterday." is supposed to exist. In this case, an action of "went to see" is a voluntary action reflecting intention of an agent of the action, and it is possible to determine that the agent of the action has a positive evaluation on, or at least an interest in, the product A. Therefore, in order to use it for estimating an evaluation of the product A held by the agent of the action, the voluntary action description extraction unit 10 extracts the description "went to see a product A".

Accordingly, the voluntary action description extraction unit 10 extracts only descriptions of voluntary actions which agents of the actions intentionally performs, such as "buy a product A", "use a product A", "listen to music on a product A", "go to see a facility A", "check about a service A" and "reserve a service A". The voluntary action description extraction unit 10 does not extract passive descriptions of involuntary actions such as "see a product A", "be given a ticket of a facility A" and "know a start of a service A".

FIG. 4 is a table showing examples of contents stored in the dictionary of voluntary action expressions 20. As shown in FIG. 4, it is only necessary for the dictionary of voluntary action expressions 20 at least to list voluntary action expressions separately. The simplest examples of voluntary action expressions are verbs expressing voluntary actions relating to a subject, among the words grammatically classified as verbs. As such verbs, "buy", "go" and the like are considered. The dictionary of voluntary action expressions 20 may be a dictionary storing such verbs expressing voluntary actions.

The dictionary of voluntary action expressions 20 may also store expressions each composed of a combination of a plurality of words which are considered to express voluntary actions relating to a subject. For example, "go to see", "make a reservation", "buy a ticket" and the like are such expressions.

Here, not all of voluntary actions relating to a subject can be keys for estimating evaluations of the subject by agents of the actions. For example, an expression "moved (a subject)" can be said to express a voluntary action relating to a subject, but it is difficult to estimate what kind of evaluation an agent of the action had on the subject from the fact that the agent only moved the subject. Therefore, without storing such voluntary action expressions difficult to use as keys of evaluation estimation from the beginning, the dictionary of voluntary action expressions 20 may stick to storing only expressions of voluntary actions performed as results of evaluations.

As voluntary actions performed as results of evaluations, actions to utilize a subject, actions with intention to utilize a subject or actions to enable utilization of a subject are representative ones.

Actions to utilize a subject correspond to, for example, such expressions as "buy", "use" and "do something with (a subject)". Actions with intention to utilize a subject correspond to, for example, such expressions as "look for" and "check about (a subject)". Actions to enable utilization of a subject correspond to, for example, such expressions as "install" and "reserve".

Next, operation of the reputation analysis system 100 will be described.

Figure 5:
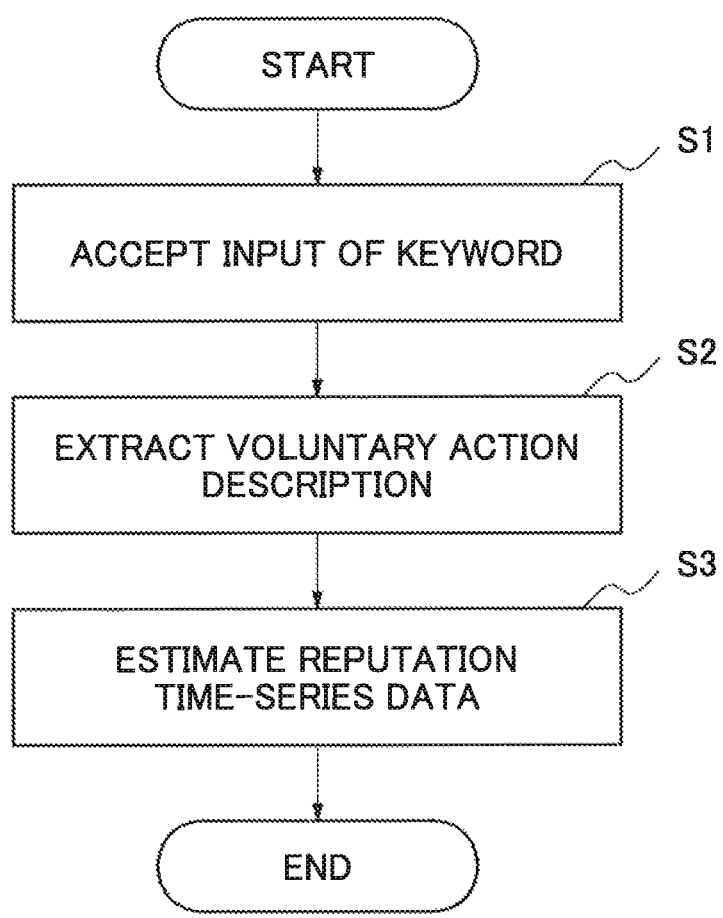
FIG. 5 is a flow chart showing operation of the reputation analysis system 100.

FIG. 5 is a flow chart showing operation of the reputation analysis system 100. As shown in FIG. 5, as a first step, the voluntary action description extraction unit 10 accepts an input of a keyword from the user (S1). Next, the voluntary action description extraction unit 10 extracts descriptions of voluntary actions from a document set (S2). Then, the reputation time-series data estimation unit 40 estimates reputation time-series data (S3).

Now, operation of S1 will be described specifically. In the present exemplary embodiment, the user performs an input of a keyword to the voluntary action description extraction unit 10 using the input device 5 which is a keyboard or the like. Alternatively, the user may perform an input of a keyword to the voluntary action description extraction unit 10 by means of an external computer connected by a network via communication IF 2. There is no particular restriction of a keyword, and, as examples of keywords, mentioned are an object, a service, an organization, an event or the like about which the user would like to determine change in evaluations with time. Further, the number of keywords to be inputted may be one, and also may be more than one if all of the inputted keywords express an identical object, service or the like.

In the way described above, the voluntary action description extraction unit 10 accepts the user's inputting a keyword by means of a keyboard or the like.

Next, operation of S2 will be described specifically. In the present exemplary embodiment, using the dictionary of voluntary action expressions 20, the voluntary action description extraction unit 10 extracts descriptions including a keyword inputted from the outside and voluntary action expressions registered in the dictionary of voluntary action expressions 20 from a document set.

Specifically, when a keyword is inputted, the voluntary action description extraction unit 10 searches a document set in the document set database 30 and acquires a document set including the inputted keyword. Then, from within the acquired document set, the voluntary action description extraction unit 10 extracts voluntary action expressions which the dictionary of voluntary action expressions 20 stores. Documents from which these expressions were extracted include descriptions including the above-mentioned keyword and voluntary action expressions. The voluntary action description extraction unit 10 may output the descriptions including the keyword and the voluntary action expressions to the reputation time-series data estimation unit 40, regarding the descriptions themselves as voluntary action descriptions (descriptions in which voluntary action expressions are included) which are given based on evaluations of a subject.

FIG. 6 is a table showing an example of data outputted by the voluntary action description extraction unit 10. As shown in FIG. 6, the voluntary action description extraction unit 10 outputs data including voluntary action expressions and time information to the reputation time-series data estimation unit 40. Here, when an expression in terms of time is included in a description including a voluntary action expression, output data corresponding to the description does not need to include time information. Details about a description in terms of time will be described later.

Next, operation of S3 will be described specifically. The reputation time-series data estimation unit 40 receives the data including voluntary action expressions outputted by the voluntary action description extraction unit 10, and on the basis of the data, it estimates time-series data which represents reputation of the subject at each point of time. The reputation time-series data outputted by the reputation time-series data estimation unit 40 is a bunch of data where values each representing a magnitude of reputation at a point of time are put into a group as a time series. The value representing a magnitude at each point of time may be a scalar value.

FIG. 7 is a table showing an example of reputation time-series data estimated by the reputation time-series data estimation unit 40. As shown in FIG. 7, reputation time-series data may be only one series of scalar values in terms of time.

Now, description will be given of a method by which the reputation time-series data estimation unit 40 estimates reputation time-series data from voluntary action descriptions, in the present exemplary embodiment. The reputation time-series data estimation unit 40 counts the number of appearances of voluntary actions for each point of time when voluntary actions expressed by descriptions expressing the voluntary actions were performed, and assigns the counting result as estimated values of reputation time-series data. That is, the reputation time-series data estimation unit 40 estimates a point of time when a voluntary action written in a voluntary action description was performed to be a point of time when an evaluation of a subject was given by an agent of the action. By counting the number of voluntary actions at each point of time when voluntary actions were performed, the reputation time-series data estimation unit 40 estimates a magnitude of reputation at each point of time.

The reputation time-series data estimation unit 40 may be configured in a manner where it estimates a point of time when a voluntary action was performed using at least either of time information indicating a time of creation or dispatching of a document and an expression in terms of time which is given in a description expressing the voluntary action.

That is, the reputation time-series data estimation unit 40 may estimate a point of time indicated by time information of a document including a voluntary action description to be a point of time when the voluntary action is performed. Further, the reputation time-series data estimation unit 40 may estimate a point of time when a voluntary action was performed using not only time information of a document but also an expression in terms of time given in the description. For example, it is supposed that a voluntary action description "I cooked using a product A yesterday." is included in a document accompanied with time information indicating a dispatching date of Apr. 5, 2005. In this case, the reputation time-series data estimation unit 40 may estimate that the voluntary action was performed on the previous day of the document dispatching, that is, Apr. 4, 2005.

Further, when time information is not attached but an expression in terms of time is included in a description including a voluntary action expression, the reputation time-series data estimation unit 40 may estimate from the expression a point of time when the voluntary action was performed. For example, it is supposed that a description "I cooked using a product A on Apr. 4, 2005." is given in a document whose dispatching date is unknown. In this case, using the expression "Apr. 4, 2005", which is an expression in terms of time, the reputation time-series data estimation unit 40 may estimate a point of time when the voluntary actions "use" and "cook" were performed to be Apr. 4, 2005.

By the way described above, the reputation time-series data estimation unit 40 estimates points of time when voluntary actions were performed, and then counts the number of appearances of voluntary actions at each point of time. On the basis of this number of appearances of voluntary actions, the reputation time-series data estimation unit 40 estimates a magnitude of reputation at each point of time.

For example, the reputation time-series data estimation unit 40 may regard the number of appearances of voluntary actions at each point of time, itself, as an estimated value representing a magnitude of reputation at each point of time, and thereby generate reputation time-series data in the form of a series of scalar values such as shown in FIG. 7. In this case, the reputation time-series data estimation unit 40 calculates a total of the numbers of appearances of all kinds of voluntary actions, regardless of what kind of evaluation each voluntary action specifically represents. That many people took voluntary actions on a subject indicates that many people were interested in the subject. Therefore, the present reputation time-series data is the one where a transition with time of a magnitude of people's interest is particularly shown in the form of a series of scalar values.

Any program which enables a computer to execute the steps S1-S3 shown in FIG. 5 may be used as a program for reputation analysis of the present exemplary embodiment. By installing the program in a computer and executing it, the user realizes the reputation analysis system 100 and the reputation analysis method. In this case, the CPU 1 of a computer shown in FIG. 1 functions as the voluntary action description extraction unit 10 and the reputation time-series data estimation unit 40 and executes the processes.

As has been described above, according to the reputation analysis system 100 according to the first exemplary embodiment, even when the number of expressions used to exhibit own evaluations, change with time in reputation of a subject indicated by a keyword can be analyzed appropriately.

It is because the reputation analysis system 100 does not extract descriptions directly exhibiting evaluations of a subject indicated by a keyword as evaluation expressions, but does focus attention on and extract descriptions expressing voluntary actions performed relating to the subject. Because of the extraction of descriptions expressing voluntary actions, the reputation analysis system 100 can measure sufficient number of values to determine a change in reputation more continuously and more constantly than the methods of extracting descriptions directly exhibiting evaluations.

<Second Exemplary Embodiment>

A reputation analysis system 100 according to a second exemplary embodiment of the present invention is different from the reputation analysis system 100 according to the first exemplary embodiment in that it uses a dictionary of voluntary action expressions 20 further storing types of evaluations of a subject by agents of voluntary actions which can be estimated from voluntary actions expressed by voluntary action expressions.

FIG. 8 is a table showing examples of contents stored in the dictionary of voluntary action expressions 20 in the second exemplary embodiment. As shown in FIG. 8, the dictionary of voluntary action expressions 20 stores, in addition to expressions which express voluntary actions relating to a subject, evaluation types of evaluations of the subject by agents of the voluntary actions which can be estimated from the voluntary actions expressed by the expressions. For example, the dictionary of voluntary action expressions 20 stores "buy" as a voluntary action expression, and stores also an evaluation type "positive" corresponding to the expression, in a pair with the expression. Accordingly, if a voluntary action of "buy" is written in a document relating to a subject, the reputation analysis system 100 estimates, using the dictionary of voluntary action expressions 20, that the agent of the action who performed an action of "buy" has a "positive" evaluation of the subject. Specifically, when there is a description "I bought a product A today.", the reputation analysis system 100 estimates that an agent of the action "buy" had a "positive" evaluation of the "product A".

The dictionary of voluntary action expressions 20 stores, for example, "positive", "negative", "neutral" and the like, as evaluation types. Also, the dictionary of voluntary action expressions 20 may store the presence or absence of an interest as an evaluation type. For example, a voluntary action "I checked about (a subject)." shows an interest in the subject.

Further, the dictionary of voluntary action expressions 20 may store optional evaluation types expressing evaluations of a subject by agents of actions, such as "be interested in", "using in daily life" and "think unnecessary". It is for enabling the reputation analysis system 100 to analyze evaluations of a subject held by agents of actions from a larger variety of viewpoints. For example, with the dictionary of voluntary action expressions 20 storing information about whether "be interested in" or "be not interested in" as a pair of voluntary action expressions, the reputation analysis system 100 may determine evaluations of a subject by agents of actions dividing them into positive evaluations and negative ones.

With respect to the first exemplary embodiment, it was mentioned that actions to utilize a subject, actions with intentions to utilize a subject and actions to enable utilization of a subject are representatives of voluntary actions performed as results of evaluations. The dictionary of voluntary action expressions 20 according to the second exemplary embodiment may store negative evaluations in pairs with actions not to utilize a subject, actions with intentions not to utilize a subject or actions to disable utilization of a subject.

Actions not to utilize a subject correspond to, for example, expressions such as "do not buy", "do not use" and "quit". Actions with intentions not to use correspond to, for example, expressions such as "stow" and "clear up". Actions to disable utilization correspond to, for example, expressions such as "discard" and "uninstall".

In the second exemplary embodiment, using the dictionary of voluntary action expressions 20, the voluntary action description extraction unit 10 extracts descriptions of voluntary actions from a document set, and outputs data including evaluation types corresponding to voluntary action expressions included in the descriptions of voluntary actions to a reputation time-series data estimation unit 40.

FIG. 9 is a table showing an example of data outputted by the voluntary action description extraction unit 10 according to the second exemplary embodiment. As shown in FIG. 9, the voluntary action description extraction unit 10 according to the present exemplary embodiment outputs data including voluntary action expressions, time information and evaluation types to the reputation time-series data estimation unit 40.

In the second exemplary embodiment, the reputation time-series data estimation unit 40 receives data including evaluation types corresponding to voluntary action expressions from the voluntary action description extraction unit 10. The reputation time-series data estimation unit 40 estimates reputation time-series data on the basis of vector values which are calculated by counting the number of appearances of evaluations of a subject by agents of voluntary actions which are estimated from expressions expressing the voluntary actions, for each type of evaluation.

FIG. 10 is a table showing an example of reputation time-series data estimated by the reputation time-series data estimation unit 40 according to the second exemplary embodiment. As shown in FIG. 10, the reputation time-series data estimation unit 40 according to the second exemplary embodiment estimates reputation time-series data in the form of a series of vector values whose elements represent respective magnitudes of reputation of "positive" and "negative".

That is, the reputation time-series data estimation unit 40 estimates reputation time-series data in the form of a series of vector values such as shown in FIG. 10, by counting the number of appearances of voluntary action descriptions at each point of time when the voluntary actions were performed, separately for each evaluation type of evaluations corresponding to the voluntary actions. For example, when considering two kinds of evaluation types, the reputation time-series data estimation unit 40 counts and sums up separately the number of appearances of voluntary action descriptions from which positive evaluations are estimated and that of voluntary action descriptions from which negative evaluations are estimated. The reputation time-series data estimation unit 40 estimates reputation time-series data composed of vector values whose elements are two values respectively representing a magnitude of positive reputation and that of negative reputation.

Now, description will be given of operation of the reputation analysis system 100 according to the second exemplary embodiment.

Operation of the reputation analysis system 100 according to the second exemplary embodiment is shown by FIG. 5 similarly to that of the reputation analysis system 100 according to the first exemplary embodiment.

However, operation of the reputation analysis system 100 according to the second exemplary embodiment is different from that of the reputation analysis system 100 according to the first exemplary embodiment in that it uses the dictionary of voluntary action expressions 20 further storing types of evaluations of a subject in the step S2 of extracting voluntary action descriptions. Further, operation of the reputation analysis system 100 according to the second exemplary embodiment is different from that of the reputation analysis system 100 according to the first exemplary embodiment also in that it counts the number of appearances of voluntary action descriptions separately for each evaluation type of evaluations corresponding to the voluntary actions in the step S3 of estimating reputation time-series data.

The step S3 is the same as that in operation of the reputation analysis system 100 according to the first exemplary embodiment, and therefore its description is omitted.

Now, operation of S2 will be described specifically. Using the dictionary of voluntary action expressions 20, the voluntary action description extraction unit 10 extracts, from a document set, descriptions including a keyword inputted from the outside and voluntary action expressions registered in the dictionary of voluntary action expressions 20. The dictionary of voluntary action expressions 20 in the second exemplary embodiment further stores evaluations of a subject by agents of voluntary actions which can be estimated from the voluntary actions expressed by voluntary action expressions.

When a keyword is inputted, the voluntary action description extraction unit 10 searches a document set in the document set database 30 and acquires a document set including the inputted keyword. Then, from within the acquired document set, the voluntary action description extraction unit 10 extracts voluntary action expressions which the dictionary of voluntary action expressions 20 stores. Documents from which these expressions were extracted include descriptions including the above-mentioned keyword and voluntary action expressions. The voluntary action description extraction unit 10 outputs data (for example, FIG. 9) including the voluntary action descriptions which includes the keyword and voluntary action expressions, and evaluation types corresponding to the voluntary action expressions to the reputation time-series data estimation unit 40.

Next, operation of S3 will be described specifically. The reputation time-series data estimation unit 40 receives the data including voluntary action expressions outputted by the voluntary action description extraction unit 10, and on the basis of the data, it estimates time-series data representing reputation of the subject at each point of time, for each evaluation type. The reputation time-series data outputted by the reputation time-series data estimation unit 40 is a bunch of data where values each representing a magnitude of reputation at respective points of time are put into a group. In the present exemplary embodiment, the values each representing a magnitude of reputation at respective points of time are each vector values.

The reputation time-series data estimation unit 40 estimates reputation time-series data, such as shown in FIG. 10, which is represented as a series of vector values each representing a magnitude of reputation for each evaluation type A program for reputation analysis in the present exemplary embodiment is a program which enables a computer to execute the steps S1-S3 shown in FIG. 5, and may be any program enabling execution of the above-described operation.

As has been described above, according to the second exemplary embodiment of the present invention, it is possible to estimate evaluations which agents of actions have on a subject from a larger variety viewpoints. It is because the dictionary of voluntary action expressions 20 stores types of evaluations considered as primary causes of a voluntary action expression in a pair with the voluntary action expression.

Further, according to the second exemplary embodiment of the present invention, because of the estimation of reputation time-series data for each evaluation type, change in evaluations of a subject can be analyzed in more detail. For example, according to the second exemplary embodiment of the present invention, possible is an analysis such as showing that positive evaluations are the same as before and only negative evaluations greatly increased.

<Third Exemplary Embodiment>

A reputation analysis system 100 according to the third exemplary embodiment of the present invention is different from the reputation analysis system 100 according to the first exemplary embodiment in that a voluntary action description extraction unit 10 of it extracts voluntary action descriptions on the basis of a regulation which prescribes positional and grammatical relations between a keyword representing a subject and a voluntary action expression.

For example, the voluntary action description extraction unit 10 may extract a voluntary action description when a voluntary action expression and a keyword representing a subject collocate with each other within a distance of N words in a sentence of the voluntary action description. Alternatively, the voluntary action description extraction unit 10 may extract a voluntary action description when a voluntary action expression and a keyword representing a subject are used there in a relation with each other which corresponds to a relation of the WO-case or the DE-case in Japanese grammar, such as "(a subject) WO TUKAU/use (a subject)" and "(a subject) DE ONGAKU WO KIKU/listen to music by (a subject)". Here, the relations corresponding to relations of the WO-case and the DE-case in Japanese Grammar are, respectively, a relation showing that between an action (an expression expressed by a verb, and the like) and an object of the action, and a relation showing that between an action and a means for the action (a tool and a method for an action, and the like). This kind of regulation on relation is applied not only to cases in Japanese language, but also may be applied to any cases where there is a relation between a voluntary action expression and a keyword representing a subject corresponding to a relation between an action and an object of the action or that between an action and a means for the action, in a language of a document which is to be a processing target when the present invention is applied.

Alternatively, a configuration may be such that the dictionary of voluntary action expressions 20 stores a regulation on positional or grammatical relations between a keyword and voluntary action expressions, relating the regulation to the voluntary action expressions, and the voluntary action description extraction unit 10 extracts only voluntary action descriptions satisfying the regulation.

The voluntary action description extraction unit 10 may extract voluntary action descriptions according to regulations determined by inflection and dependent words, and those expressed by them such as polarity (whether positive or negative form), voice, aspect, tense, mood and modality.

The voluntary action description extraction unit 10 may extract voluntary action descriptions considering evaluation types as in the second exemplary embodiment and accordingly determining an evaluation type as positive for descriptions whose polarity is positive and as negative for descriptions whose polarity is negative. Specifically, the voluntary action description extraction unit 10 extracts descriptions with positive polarity such as "I bought (a subject)." determining their evaluation types as positive. Further, the voluntary action description extraction unit 10 extracts descriptions with negative polarity such as "I did not buy (a subject)." determining their evaluation types as negative.

Further, even when expressions do not express actually performed actions but do situations where objectives have not been accomplished, such as "intended to utilize", "intended to buy" and "intended to use", the voluntary action description extraction unit 10 may extract them regarding them as voluntary action expressions. For example, a description such as "Today, I intended to utilize a facility A, but could not, because it was closed." is supposed to exist. The voluntary action description extraction unit 10 may extract this voluntary action description, determining that an agent of the action to intend to utilize the facility A had a positive evaluation of the facility A even if the agent could not utilize it actually.

On the other hand, the voluntary action description extraction unit 10 does not need to extract actions performed under enforcement from the outside and actions reluctant to the agents, not regarding them as voluntary action expressions, even if they are actions usually regarded as voluntary actions. For example, the voluntary action description extraction unit 10 may extract descriptions according to a regulation such as that where an expression "I used (a subject)" is regarded as a voluntary action but expressions "I enforced to use (a subject)" and "I unintentionally used (a subject)" are not regarded as voluntary actions.

The voluntary action description extraction unit 10 may extract voluntary action descriptions according to a regulation on an agent of action. For example, while the voluntary action description extraction unit 10 extracts a description "Yesterday, I bought (a subject)", it does not need to extract a description "Yesterday, some star said that he bought (a subject)". It is because, in the case of the description "Yesterday, I bought (a subject)", the agent of the action "bought" is the writer of the document. Therefore, the action "bought" can be said to be an action reflecting an evaluation by the writer of the document. In contrast to it, in the case of the description "Yesterday, some star said that he bought (a subject)." the agent of the action is the star. Therefore, the action "bought" in this case can be said to be an action reflecting an evaluation by the star. Even if descriptions written by a large number of people telling about an identical action by the star are collected, only an evaluation by that one star can be known, but no keys for knowing evaluations by the large number of people themselves can be obtained from the descriptions. Therefore, the voluntary action description extraction unit 10 may extract descriptions according to a regulation that a description is extracted only when the agent of the action expressed in the voluntary action description is the writer of the document.

Besides, the voluntary action description extraction unit 10 can extract voluntary action descriptions more precisely, according to regulations prescribing a relation between a voluntary action expression and a keyword representing a subject in a variety of ways.

Now, description will be given of operation of the reputation analysis system 100 according to the third exemplary embodiment.

Operation of the reputation analysis system 100 according to the third exemplary embodiment is shown by FIG. 5, similarly to the reputation analysis system 100 according to the first exemplary embodiment.

However, in the operation of the reputation analysis system 100 according to the third exemplary embodiment, operation of the step S2 of extracting voluntary action descriptions is different from that in the reputation analysis system 100 according to the first exemplary embodiment. That is, in the present exemplary embodiment, the voluntary action description extraction unit 10 extracts voluntary action descriptions according to a regulation which prescribes positional or grammatical relations between a keyword representing a subject and a voluntary action expression.

Here, the steps S1 and S3 are the same as that of the reputation analysis system 100 according to the first exemplary embodiment, and therefore their descriptions are omitted.

Now, operation of S2 will be described specifically. The voluntary action description extraction unit 10 may extract a voluntary action description when a voluntary action expression and a keyword representing a subject collocate with each other within a distance of N words in a sentence of the voluntary action description. Alternatively, the voluntary action description extraction unit 10 may extract a voluntary action description when a voluntary action expression and a keyword representing a subject are used there in a relation with each other which corresponds to a relation of the WO-case or the DE-case in Japanese grammar, such as "(a subject) WO TUKAU/use (a subject)" and "(a subject) DE ONGAKU WO KIKU/listen to music by (a subject)". Here, the relations corresponding to relations of the WO-case and the DE-case in Japanese Grammar are, respectively, a relation showing that between an action (an expression expressed by a verb, and the like) and an object of the action, and a relation showing that between an action and a means for the action (a tool and a method for an action, and the like).

Besides, the voluntary action description extraction unit 10 extracts voluntary action descriptions according to the variety of regulations already described above.

A program for reputation analysis in the present exemplary embodiment is a program which enables a computer to execute the steps S1-S3 shown in FIG. 5, and may be any program enabling execution of the above-described operation.

As has been described above, according to the third exemplary embodiment of the present invention, evaluations held by agents of actions can be estimated more precisely. It is because the voluntary action description extraction unit 10 extracts voluntary action descriptions according to a regulation determined by positional or grammatical relations between a keyword representing a subject and a voluntary action expression.

<Fourth Exemplary Embodiment>

Figure 11:
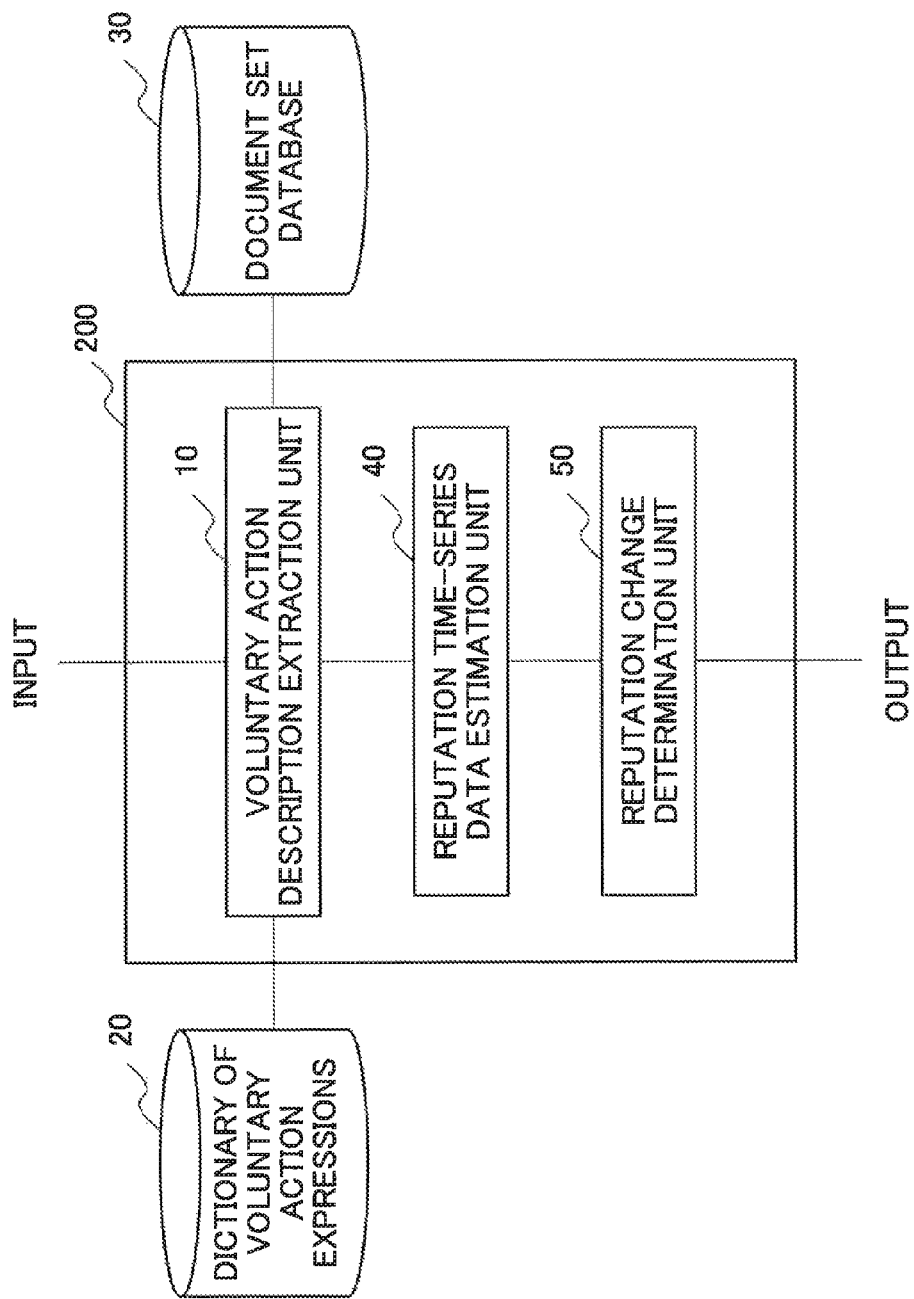
FIG. 11 is a block diagram showing a functional configuration of a reputation analysis system 200 according to a fourth exemplary embodiment of the present invention.

FIG. 11 is a block diagram showing a functional configuration of a reputation analysis system 200 according to a fourth exemplary embodiment of the present invention. As shown in FIG. 11, the reputation analysis system 200 according to the fourth exemplary embodiment of the present invention is different from the reputation analysis system 100 in that it further comprises a reputation change determination unit 50.

A voluntary action description extraction unit 10, a dictionary of voluntary action expressions 20, a document set database 30 and a reputation time-series data estimation unit 40 are the same as those described with respect to the first exemplary embodiment, and therefore their descriptions are omitted.

The reputation change determination unit 50 determines change with time in reputation of a subject, on the basis of an estimation result by the reputation time-series data estimation unit 40. The reputation change determination unit 50 outputs the estimated change with time in reputation of a subject as visualized data to, for example, the output device 6.

On the basis of reputation time-series data outputted by the reputation time-series data estimation unit 40, the reputation change determination unit 50 determines the amount of change in reputation around a specified point of time t. Here, a specific point of time t is present within a time range from the oldest point of time to the newest point of time treated in reputation time-series data. The reputation change determination unit 50 determines a change in reputation around the point of time t by determining the amount of change in a magnitude of the reputation, setting t as a reference point. The reputation change determination unit 50 may generate time-series data of the amount of change in reputation, by setting a plurality of t's and thereby calculating the amounts of change at the plurality of points of time.

There are a variety of ways to define specified points of time t's. The reputation change determination unit 50 may determine a change in reputation for every point of time included in reputation time-series data. Alternatively, the reputation change determination unit 50 may define t's by randomly sampling optional points of time in a range from the oldest point of time to the newest point of time treated in reputation time-series data. Further, the user may register in advance a particular point of time, such as a date and time when an event relating to a subject occurred, as t in the reputation change determination unit 50.

Now, operation of the reputation analysis system 200 according to the fourth exemplary embodiment will be described.

Figure 12:
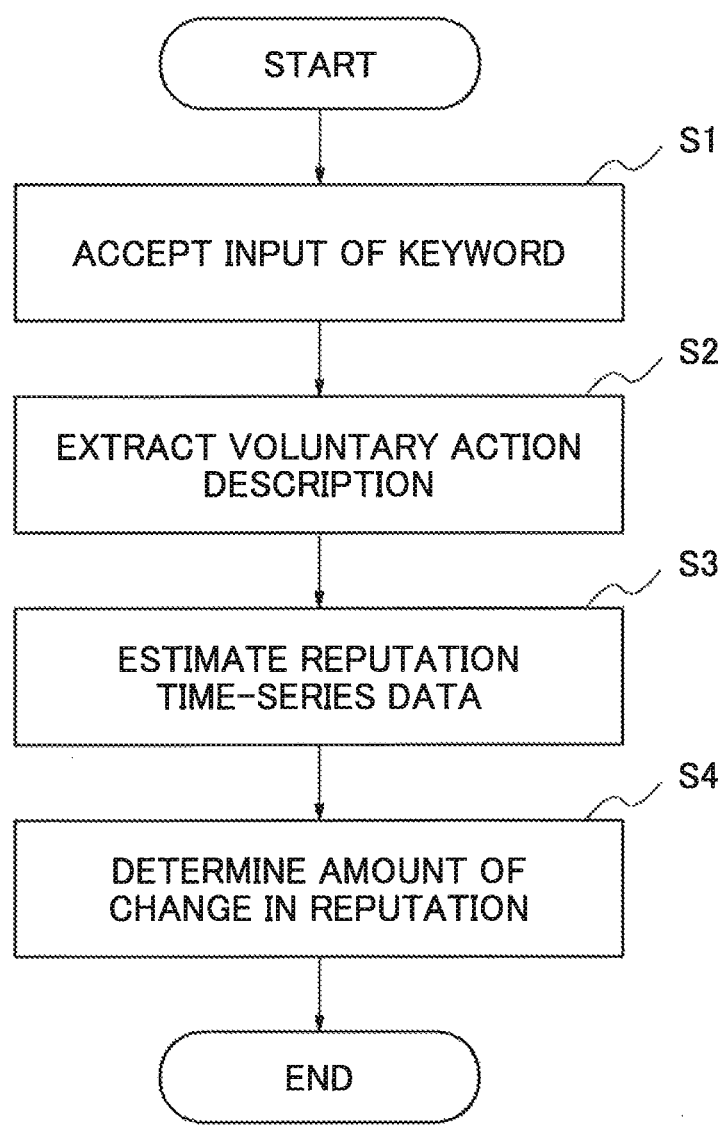
FIG. 12 is a flow chart showing operation of the reputation analysis system 200 according to the fourth exemplary embodiment.
Figure 15:
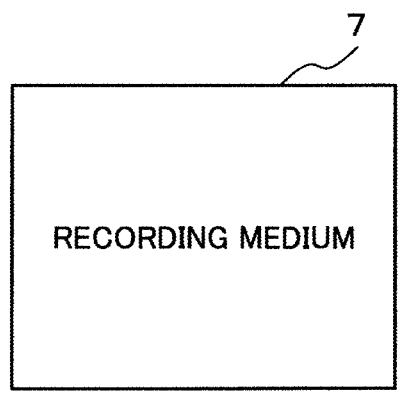
FIG. 15 is an explanatory drawing showing a non-transitory computer-readable recording medium.

FIG. 12 is a flow chart showing operation of the reputation analysis system 200 according to the fourth exemplary embodiment. As shown in FIG. 12, the operation of the reputation analysis system 200 is different from the operation of the reputation analysis system 100 according to the first exemplary embodiment (FIG. 5) in that it includes a step S4 of determining the amount of change in reputation.

The steps S1-S3 are the same as those of the reputation analysis system 100 according to the first exemplary embodiment, and therefore their descriptions are omitted.

In S4, the reputation change determination unit 50 determines the amount of change in reputation. The reputation change determination unit 50 determines the amount of change in reputation at a point of time t by setting t as a reference point and comparing reputation time-series data for a period before t with reputation time-series data for a period after t.

Now, specific description will be given of operation of the reputation change determination unit 50 when reputation time-series data outputted by the reputation time-series data estimation unit 40 is a series of scalar values. With respect to a point of time t within a time range subjected to the time-series data, the reputation change determination unit 50 sums up values in reputation time-series data about each of periods of a few days before t and of a few days after t, with t set as a reference point of time. The reputation change determination unit 50 calculates a ratio between the summed values each about the past and the future, and regards the obtained ratio as the amount of change at the point of time t.

FIG. 13 is a table showing an example of data outputted by the reputation change determination unit 50 when reputation time-series data is a series of scalar values. As shown in FIG. 13, the reputation change determination unit 50 may output data where time information and the amount of change at each point of time subjected to the determination are combined into a pair. The data in FIG. 13 is that obtained by summing up values (estimated values in FIG. 7) of preceding two days of a reference point of time t and values of subsequent two days of the time t, respectively, and then calculating a ratio between the summed values. Columns where "–" are given are of periods on which determination was not performed because data was insufficient for either the past or the future.

When reputation time-series data outputted by the reputation time-series data estimation unit 40 is a series of vector values, the reputation change determination unit 50 calculates the amount of change at each point of time t, in a similar way to the case of scalar values, for each of elements constituting a vector value. The reputation change determination unit 50 outputs time-series data representing the amount of change in reputation for each evaluation type.

FIG. 14 is a table showing an example of data outputted by the reputation change determination unit 50 when reputation time-series data is a series of vector values. As shown in FIG. 14, when reputation time-series data is a series of vector values each composed of two elements representing positive reputation and negative reputation respectively, the reputation change determination unit 50 calculates separately the amount of change in the value of the element representing positive reputation and that in the value of the element representing negative reputation, at a point of time t. The reputation change determination unit 50 outputs a series of vector values each composed of two elements which are the amounts of changes at a point of time respectively in the value representing positive reputation and in the value representing negative reputation. Values of each element of the vector of the output example in FIG. 14 are that obtained, similarly to the case of FIG. 13, by summing up values (values of each vector element in FIG. 10) of preceding two days and that of subsequent two days, respectively, and then calculating a ratio between the summed values.

Further, instead of considering the amount of change separately with respect to each element constituting a vector value, the reputation change determination unit 50 may calculate the amount of change in a combination of a plurality of elements. For example, the reputation change determination unit 50 may calculate a sum of values of a plurality of elements at each point of time to produce a time series, and then calculate the amount of change with respect to the series of sums. Further, the reputation change determination unit 50 may calculate a ratio between a plurality of elements at each point of time to produce a time series, and then calculate the amount of change with respect to the series of ratios. The reputation change determination unit 50 may calculate the amount of change with respect to these series similarly to calculating the amount of change with respect to scalar values.

A program for reputation analysis in the present exemplary embodiment may be any program which enables a computer to execute the steps S1-S4 shown in FIG. 12.

As has been described above, according to the fourth exemplary embodiment of the present invention, change with time in reputation of a subject indicated by a keyword can be determined at a glance. It is because the reputation change determination unit 50 outputs the amounts of change in reputation.

Here, a program of each of the first to the fourth exemplary embodiments described above may be such that a recording medium 8 which records codes of the program is provided in a computer which realizes a reputation analysis system, and a CPU 1 retrieves and executes the codes of the program stored in the recording medium 8. Alternatively, a CPU 1 may store (install) the codes of the program stored in the recording medium 8 into either or both of a memory 3 and an HDD 4. That is, the first to the fourth exemplary embodiments described above include the exemplary embodiment of a recording medium 8 which stores temporarily or permanently a program (software) to be executed by a computer (CPU 1).

While the invention has been particularly shown and described with reference to exemplary embodiments thereof, the invention is not limited to those specific exemplary embodiments. It will be understood by those of ordinary skill in the art that various changes in form and details may be made therein without departing from the spirit and scope of the present invention.

This application is based upon and claims the benefit of priority from Japanese Patent Application No. 2009-269484, filed on Nov. 27, 2009, the disclosure of which is incorporated herein in its entirety by reference.

INDUSTRIAL APPLICABILITY

As described above, the present invention is useful as a reputation analysis system which can appropriately determine change with time in reputation of a subject indicated by a keyword.

DESCRIPTION OF THE REFERENCE NUMERALS

1 CPU
2 communication IF
3 memory
4 HDD
5 input device
6 output device
7 bus
10 voluntary action description extraction unit
20 dictionary of voluntary action expressions
30 document set database
40 reputation time-series data estimation unit
50 reputation change determination unit
100 reputation analysis system according to a first exemplary embodiment
200 reputation analysis system according to a fourth exemplary embodiment
400 Non-transitory computer-readable recording medium

The invention claimed is:

1. A reputation analysis system comprising:
voluntary action description extraction unit, implemented by a hardware processor, which extracts, from a plurality of documents, a description representing a voluntary action relating to a subject indicated by an input keyword;
a dictionary of voluntary action expressions for storing expressions expressing voluntary actions relating to a subject, and
reputation time-series data estimation unit, implemented by the hardware processor, which counts a number of appearances of voluntary actions for each point of time when the voluntary action expressed by the description representing the voluntary action relating to said subject is performed, and thereby estimating reputation time-series data which represents evaluations of said subject by agents of the voluntary actions in a form of a time series,
wherein said voluntary action description extraction unit extracts, using said dictionary of voluntary action expressions, the description including said keyword and an expression stored in said dictionary of voluntary action expressions, from said plurality of documents.

2. The reputation analysis system according to claim 1, wherein
said reputation time-series data estimation unit estimates a point of time when the voluntary action is performed, using at least either of time information representing a time of creation or a time of dispatching of said document and the expression relating to time in the description representing the voluntary action.

3. The reputation analysis system according to claim 1, wherein
said dictionary of voluntary action expressions stores, in addition to the expressions expressing voluntary actions relating to the subject, evaluation types of evaluations of said subject by agents of actions which is estimated from the voluntary actions expressed by said expressions.

4. The reputation analysis system according to claim 3, wherein
said reputation time-series data estimation unit estimates said reputation time-series data on a basis of vector values which are calculated by counting, in terms of each of the evaluation types, the number of appearances of evaluations of said subject by agents of actions estimated from said expressions expressing voluntary actions.

5. The reputation analysis system according to claim 1, wherein
said voluntary action description extraction unit extracts a voluntary action description according to a regulation which prescribes positional or grammatical relations between said keyword and said expressions expressing voluntary actions.

6. The reputation analysis system according to claim 1, further comprising
reputation change determination unit which determines change with time in reputation of said subject on the basis of an estimation result by said reputation time-series data estimation unit.

7. The reputation analysis system according to claim 6, wherein
said reputation change determination unit outputs the estimated said change with time in reputation as visualized data.

8. A reputation analysis method by a computer including a dictionary of voluntary action expressions for storing expressions expressing voluntary actions relating to a subject, comprising:
extracting, by the computer, from a plurality of documents, a description representing a voluntary action relating to a subject indicated by an input keyword and extracting, using said dictionary of voluntary action expressions, the description including said keyword and an expression stored in said dictionary of voluntary action expressions, from said plurality of documents; and
counting, by the computer, a number of appearances of voluntary actions for each point of time when the voluntary action expressed by the description representing the voluntary action relating to said subject is performed, and thereby estimating, by the computer, reputation time-series data which represents evaluations of said subject by agents of the voluntary actions in the form of a time series.

9. A non-transitory computer-readable program recording medium storing a program for reputation analysis for enabling a computer including a dictionary of voluntary action expressions for storing expressions expressing voluntary actions relating to a subject to execute the processes of:
extracting, from a plurality of documents, a description representing a voluntary action relating to a subject indicated by an input keyword;
extracting, using said dictionary of voluntary action expressions, the description including said keyword and an expression stored in said dictionary of voluntary action expressions, from said plurality of documents; and
counting a number of appearances of voluntary actions for each point of time when the voluntary action expressed by the description representing the voluntary action relating to said subject is performed, and thereby estimating reputation time-series data which represents evaluations of said subject by agents of the voluntary actions in the form of a time series.

10. A reputation analysis system comprising:
a dictionary of voluntary action expressions for storing expressions expressing voluntary actions relating to a subject;
voluntary action description extraction means for extracting, from a plurality of documents, a description representing a voluntary action relating to a subject indicated by an input keyword and extracting, using said dictionary of voluntary action expressions, the description including said keyword and an expression stored in said dictionary of voluntary action expressions, from said plurality of documents; and
reputation time-series data estimation means for counting a number of appearances of voluntary actions for each point of time when the voluntary action expressed by the description representing the voluntary action relating to said subject, and thereby estimating reputation time-series data which represents evaluations of said subject by agents of the voluntary actions in the form of a time series.

* * * * *